United States Patent [19]

DeLiso et al.

[11] Patent Number: 5,451,444
[45] Date of Patent: Sep. 19, 1995

[54] CARBON-COATED INORGANIC SUBSTRATES

[76] Inventors: Evelyn M. DeLiso, 248 Chemung St., Corning, N.Y. 14830; Kishor P. Gadkaree, 273 Orchard Dr., Big Flats, N.Y. 14814; Joseph F. Mach, 322 Stevens Rd., Lindley, N.Y. 14858; Kevin P. Streicher, 447 Main St., Big Flats, N.Y. 14814

[21] Appl. No.: 11,385

[22] Filed: Jan. 29, 1993

[51] Int. Cl.$^6$ ............................................. B32B 3/12
[52] U.S. Cl. .............................. 428/116; 52/793.1; 428/408; 502/527
[58] Field of Search ................... 428/116, 118, 408; 502/527; 52/806

[56] References Cited

U.S. PATENT DOCUMENTS

| | | | |
|---|---|---|---|
| 3,112,184 | 11/1963 | Hollenbach | 428/116 X |
| 3,397,154 | 8/1968 | Talsma | 428/116 X |
| 3,444,925 | 5/1969 | Johnson | 428/116 X |
| 3,775,078 | 11/1973 | Elmer et al. | 427/224 X |
| 3,790,654 | 2/1974 | Bagley | 428/116 X |
| 3,824,196 | 7/1974 | Benbow et al. | 428/116 X |
| 3,825,460 | 7/1974 | Yoshikawa et al. | 428/116 X |
| 3,859,421 | 1/1975 | Hucke | 264/44 X |
| 3,922,412 | 11/1975 | Yoshikawa et al. | 428/118 |
| 3,995,143 | 11/1976 | Hervert | 428/116 X |
| 4,386,947 | 6/1983 | Mizuno et al. | 123/519 X |
| 4,399,052 | 8/1983 | Sugino | 428/116 X |
| 4,518,704 | 5/1985 | Okabayashi et al. | 428/116 X |
| 4,992,319 | 2/1991 | Kurosawa et al. | 428/116 |
| 4,999,330 | 3/1991 | Bose et al. | 502/402 |
| 5,043,310 | 8/1991 | Takeuchi et al. | 502/404 |
| 5,104,425 | 4/1992 | Rao et al. | 55/16 |
| 5,104,540 | 4/1992 | Day et al. | 428/116 X |
| 5,326,633 | 7/1994 | Clough et al. | 428/224 X |
| 5,356,852 | 10/1994 | DeLiso et al. | 502/527 X |
| 5,389,325 | 2/1995 | Bookbinder et al. | 428/408 X |

FOREIGN PATENT DOCUMENTS

| | | |
|---|---|---|
| 0448302 | 9/1991 | European Pat. Off. . |
| 678915 | 9/1952 | United Kingdom . |
| 1204353 | 9/1970 | United Kingdom . |

*Primary Examiner*—Henry F. Epstein
*Attorney, Agent, or Firm*—Scott M. Terrillion; Kees van der Sterre

[57] ABSTRACT

A composite including an inorganic substrate having an outer surface from which pores extend into the substrate and a coating extending over the substrate's outer surface as a substantially uninterrupted layer of carbon. The coating penetrates into the pores of the inorganic substrate. The composite can be made by a process including the steps of contacting an inorganic substrate with a coating and impregnating liquid consisting essentially or wholly of a carbon precursor liquid, treating the inorganic substrate under conditions effective to cure substantially the carbon precursor liquid, and heating the inorganic substrate under conditions effective to convert substantially the cured carbon precursor liquid to carbon.

16 Claims, No Drawings

CARBON-COATED INORGANIC SUBSTRATES

FIELD OF THE INVENTION

The present invention relates to substrates coated with activated carbon useful for filtering impurities from fluid streams.

BACKGROUND OF THE INVENTION

Activated carbon is a nongraphitic, microcrystalline form of carbon which has been processed to produce a carbon with high porosity. The pores formed in the activated carbon may be macropores (e.g., pores having a diameter greater than about 500 angstroms), mesopores (e.g., pores having a diameter between about 20 and 500 angstroms), or micropores (e.g., pores having a diameter less than about 20 angstroms). Activated carbon is characterized by a high specific surface area (e.g., 300 to 2500 $m^2/g$) and is known for its high adsorptive capability. Activated carbon enjoys widespread use in the removal of impurities from fluid (i.e., liquid or gas) streams. For example, impurities in foods (e.g., fruit juices, alcoholic beverages) or medicinals (e.g., insulin, vitamins) can be successfully filtered using activated carbon. Likewise, activated carbon is useful in the removal of gaseous species present in low concentrations in air or gas streams (e.g., in gas separation processes, processes for removal of organic vapors, or in cigarette filters). Activated carbon has particular utility in adsorbing and purifying fluid emissions from internal combustion engines.

Conventionally, activated carbon is used in a powdered or granular form. Powdered or granular activated carbon is inconvenient to use in processes where continuous flows of fluids are filtered and/or treated. To solve this problem, attempts have been made to use activated carbon in the form of, or in conjunction with, a solid substrate.

For example, attempts have been made to manufacture monolithic substrates consisting essentially of activated carbon or to extrude carbonaceous material as a substrate and then convert the entire substrate to activated carbon. In such processes, a binder is typically added to the activated carbon powder and the mixture is extruded as a monolithic substrate. See, for example, U.S. Pat. Nos. 5,043,310 to Takeuchi, et al., 4,999,330 to Bose, et al., 4,399,052 to Sugino, and 4,386,947 to Mizuno, et al. Substrates formed by these methods have limited utility. For example, the binder used to facilitate extrusion will block the pores of the activated carbon and, therefore, diminish the substrate's adsorption capability. If the amount of binder is reduced to minimize blocking, the strength of the substrate is unacceptably reduced. Furthermore, most substances useful as extrusion binders begin to deteriorate at temperatures above 150° C., further diminishing their applicability. Lastly, components of the process stream being filtered often react with commonly used extrusion binders, causing the binder to deteriorate during use. For example, water present in a fluid stream will dissolve methylcellulose, a very commonly used extrusion binder.

U.S. Pat. No. 4,518,704 to Okabayashi, et al. describes a method for making an activated carbon substrate using an inorganic binder (e.g., clay, talc, alumina, fusible glass powder). The high percentage of binder particles required to achieve minimal strength in the honeycomb, however, results in low adsorptive capability. Furthermore, the strength of the formed substrate remains low due to the poor bonding of the carbon to the inorganic binders.

Other, likewise unsatisfactory, attempts to form carbon substrates feature coating a substrate with, for example, a slurry of carbon in a binder. See U.S. Pat. Nos. 4,992,319 to Kurosawa, et al. and 5,104,540 to Day, et al. The requisite binder in the carbon coating results in substrates with poor adsorptive capability due to the binder particles closing off some of the porosity in the activated carbon. Furthermore, the activated carbon is prone to flaking or chipping off the substrate due to the weak bond between the binder, the carbon, and the substrate. Therefore, there continues to be a need for substrates utilizing activated carbon that are strong, temperature resistant, resistant to chipping or flaking, and highly adsorptive.

SUMMARY OF THE INVENTION

The present invention relates to composites which include an inorganic substrate having an outer surface from which pores extend into the substrate and a coating extending over the substrate's outer surface as a substantially uninterrupted layer of carbon. The carbon coating penetrates into and is distributed substantially throughout the pores of the inorganic substrate. We have unexpectedly discovered that the composites of the present invention exhibit very high adsorptive capabilities despite containing relatively low amounts of carbon.

Substrates according to the present invention can be produced by a process including the steps of providing an inorganic substrate and contacting the inorganic substrate with a coating and impregnating substance consisting essentially or wholly of a carbon precursor liquid. Next, the inorganic substrate is treated under conditions effective to cure substantially the carbon precursor liquid. The substrate is then heated under conditions effective to convert the cured carbon precursor liquid to carbon. Preferably, the carbon-substrate composite is then treated under conditions effective to activate the carbon.

The composites of the present invention have carbon coatings that are highly resistant to chipping or flaking off, exhibit high strength, and are resistant to high temperatures. In addition, the inventive composites exhibit adsorptive capabilities unexpectedly higher than prior art substrates manufactured in the form of extruded carbon or substrates dipped in a slurry of activated carbon and binder.

DETAILED DESCRIPTION OF THE INVENTION

The composite of the present invention includes an inorganic substrate having an outer surface from which pores extend into the substrate and a coating extending over the substrate's outer surface as a substantially uninterrupted layer of carbon. The carbon coating penetrates into and is distributed substantially throughout the pores of the inorganic substrate. The carbon in the pores is believed to form a coating on the walls of the pores. The present composite can be produced by a method including the steps of providing an inorganic substrate which is contacted with a coating and impregnating substance consisting essentially or wholly of a carbon precursor liquid. The inorganic substrate is then heated under conditions effective to cure substantially the carbon precursor liquid. The substrate is then heated to convert the cured carbon precursor liquid to carbon. Preferably, the substrate is then treated under conditions effective to activate the carbon.

The inorganic substrate of the present invention can be made from any known material and made by any known process. The only requirement is that the substrate have pores extending from its outer surface and be capable of withstanding the temperatures required to cure and convert the carbon precursor and to activate the carbon. The overall porosity of the substrate should be greater than about 10 percent. The overall porosity of the substrate is preferably greater than 25, most preferably greater than 40, percent. For most purposes the desirable range of porosity is between 45 and 55 percent. Preferably, the pores of the substrate material create "interconnecting porosity." Interconnecting porosity is characterized by pores which connect into and/or intersect other pores to create a tortuous network of porosity within the substrate. In accordance with the present method, carbon precursor liquid penetrates into this interconnecting porosity and, upon curing and carbonization, creates a coating that is physically interlocked within the interconnecting porosity of the substrate.

Suitable porous substrate materials include metallic as well as ceramic materials.

For example, alumino-silicates (e.g., porcelains), silicates, titanates, zirconates, zirconia, zirconia-spinel, and magnesium alumino-silicates, alumina, spinel, mullite, and cordierite are all suitable ceramic substrate materials. Particularly useful inorganic substrates are rigid, refractory materials which exhibit interconnecting porosity, such as cordierite. Cordierite is also preferred because its coefficient of thermal expansion is comparable to that of carbon, increasing the stability of the formed composite.

Metallic materials suitable for constituting the substrate are generally any metal or alloy or intermetallic compound that provides durable structural service, and desirably one that does not soften below about 600° C. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and European Patent Application Publication No. 488716A1 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. European Patent Application Publication No. 488716A1 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as e.g., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

The substrate can take any known form including, for example, tubes, foams, multicellular bodies, or honeycombs. The composite is preferably a honeycomb having a matrix of thin walls forming a multiplicity of open-ended cells extending between the ends of said honeycomb. A honeycomb substrate can have cell density of at least about 7.75 cells per square cm and as high as about 125 cells per square cm, but more desirably in the range of 15.5-93 cells/cm$^2$ and presently preferably 62 cells/cm$^2$.

The thickness of walls in a honeycomb substrate can be in the range of about 0.05 to 1.27 mm, while at least 0.076 mm is more practical, and desirably about 0.15 to 0.5 mm.

Preferred substrates and their methods of manufacture are disclosed in U.S. Pat. Nos. 3,790,654 to Bagley and 3,824,196 to Benbow, et al. Other illustrative fabrication techniques, which are useful for this invention, are shown in U.S. Pat. Nos. 3,112,184, 3,397,154, and 3,444,925.

In accordance with the present method, the inorganic substrate is first contacted with a coating and impregnating substance consisting essentially or wholly of a carbon precursor liquid. For the purposes of this invention, a carbon precursor liquid includes carbon precursor solutions, carbon precursors that are liquid at ambient temperatures, or carbon precursors otherwise capable of being liquefied by heating or other methods. Contacting can be accomplished by any method suitable to bring the carbon precursor solution in intimate contact with the inorganic substrate. Exemplary methods of contacting include dipping the substrate in the precursor solution or spraying the precursor solution directly on the substrate.

The eventual quantity of carbon formed on the composite is dependent on the amount of carbon precursor retained by the inorganic substrate. The amount of carbon precursor retained by the substrate can be increased, for example, by contacting the substrate with the precursor liquid more than once and allowing the substrate to dry between contacting steps. In addition, the amount of precursor retained by the substrate can be controlled in porous substrates by simply modifying the overall porosity of the substrate (e.g., increasing porosity will increase the amount of precursor retained by the porous substrate and, in turn, the amount of carbon formed).

Carbon precursors useful in the present method include any liquid or liquefiable carbonaceous substance. Examples of useful carbon precursors include thermoplastic resins (e.g., polyvinylidene chloride, polyvinyl chloride, polyvinyl alcohol, and the like), thermoset resins (e.g., epoxies, phenolic resins, polyesters, polyimides, and the like), sugar solutions, furfuryl alcohol, and coal tar pitch.

Low viscosity carbon precursors (e.g., thermoset resins) are preferred because their low viscosity allows greater penetration of the carbon precursor into porous inorganic substrates. Phenolic resins are most preferred due to their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the formed composite.

After the contacting step, the inorganic substrate is treated under conditions effective to cure (i.e., solidify) the carbon precursor on (and within) the inorganic substrate. Curing is typically accomplished by heating the coated inorganic substrate to temperatures in the range of about 100° to 200° C. for about 0.5 to 5.0 hours. Curing is generally performed in air at atmospheric pressure. When using certain precursors (e.g., furfuryl alcohol) curing can be accomplished by adding an acid catalyst at room temperature.

The inorganic substrate is then heated under conditions effective to convert substantially the cured carbon precursor to carbon. Essentially, carbonization is the thermal decomposition of the carbonaceous material, thereby eliminating low temperature species (e.g., carbon dioxide, water, etc.) and producing a fixed carbon mass and a rudimentary pore structure.

Such conversion or carbonization of the cured carbon precursor is typically accomplished by heating the substrate to a temperature in the range of 600° to 1000° C. for about 1 to 10 hours in a reducing or inert atmosphere (e.g., nitrogen, argon).

Curing and carbonizing the carbon precursor on the substrate results in a composite with a coating extending over the outer surface of the substrate in the form of a substantially uninterrupted layer of carbon. In accordance with the present method, this continuous carbon coating is anchored into the porosity of the substrate and, as a result, is highly adherent. The top surface of the carbon coating is an uninterrupted layer of carbon to carbon bonds. This can be contrasted with a "discontinuous" carbon coating obtained, for example, on structures coated with a slurry of binder and activated carbon. In slurry-coated structures, activated carbon is bound to the binder which, in turn, is bound to the substrate. As a result, binder particles are necessarily interspersed throughout the carbon coating, rendering it discontinuous.

As discussed above, if interconnecting porosity is present in the substrate, an interlocking network of carbon will be formed within the composite, resulting in an even more adherent carbon coating. The coating of uninterrupted carbon extending over the outer surface of the substrate formed in accordance with the present method provides a composite with unexpected advantages, i.e., high adsorptive capability despite a relatively low carbon content, high strength, and high use temperatures. In accordance with the present invention, composites can be formed which contain carbon in an amount less than and up to about 50 percent, often less than and up to about 30 percent, of the total weight of the composite.

The surprisingly high adsorption capacity of these substrates compared, for example, to substrates formed by extruding mixtures of activated carbon and binder is illustrated below in Examples 13, 14 and 15 where the adsorption capacity per gram of carbon is shown to be two to three times that of extruded "all carbon" honeycombs having the same geometry.

Preferably, the carbon on the cured and carbonized composite is activated. The objective of the activation process is to enhance the volume and to enlarge the diameter of the pores formed during the carbonization process, as well as to create new porosity. Activation of the carbon creates a high surface area and, in turn, imparts high adsorptive capability to the composite of the present invention. Any known method for activating carbon can be employed. Useful activation methods generally take the form of exposing the composite to an oxidant such as steam, carbon dioxide, metal chloride (e.g., zinc chloride), phosphoric acid, or potassium sulfide, at high temperatures (e.g., about 600° to 1000° C.).

The invention is further illustrated by the following non-limiting examples.

EXAMPLES

Example 1

A sample was core drilled from a cordierite honeycomb having about 60 cells per square centimeter ("cells/cm$^2$"), a wall thickness of about 150 microns, and an overall porosity of 30 percent which was prepared according to the procedures described in U.S. Pat. Nos. 3,885,977 and 4,001,028. The core drilled sample had a length and diameter of 2.54 centimeters ("cm"). The sample was dipped for 10 minutes in Plyophen TM 43-290, a phenolic resole solution supplied by Occidental Chemical Co., Niagara Falls, N.Y. The sample was removed from the resole solution and allowed to rest on an absorbent paper towel to drain excess resin from the cells. The sample was then dried at 60° C. for 30 minutes in air and then cured at 150° C. for 30 minutes. The resin formed a strong, highly cross-linked coating on the surface of the substrate upon curing. The coated honeycomb was next heated in a nitrogen atmosphere at a rate of 100° C. per hour to 900° C. and held at that temperature for one hour to convert the cured resin to carbon (i.e., to carbonize the resin). Next, the sample was cooled to room temperature in the nitrogen atmosphere. The sample was then heated at a rate of 200° C. per hour to 800° C. and the carbon was activated by exposing the substrate to a flow of 23 mole percent steam in nitrogen for one hour. At the end of the hour, the steam flow was stopped and the sample was cooled in a nitrogen atmosphere to room temperature.

The sample was subjected to adsorption measurement on a bench scale system. The sample was kept in a flowstream of 1500 parts per million (ppm) n-butane in nitrogen at a rate of 4000 milliliters ("ml") per minute. A hydrocarbon analyzer using a flame ionization detection method (sold by Rosemount Analytical, Model 400A) measured the percentage of hydrocarbon passing through the system. The readings were recorded every 30 seconds. The total mass of hydrocarbon adsorbed was obtained by integrating the area of a plot of the percentage of hydrocarbon versus time, based on the rate and concentration of the hydrocarbon used.

The two minute adsorption efficiency was also determined from this curve. Useful composites for adsorption of automotive fuel emissions should exhibit a two minute adsorption efficiency of greater than 90 weight percent.

The two minute adsorption efficiency for the sample was 99.68 weight percent and the total hydrocarbon adsorbed was 55 mg, indicating that the composite according to the present invention exhibits excellent adsorptive capability.

Example 2

A sample was prepared according to the procedure described in Example 1, except that the quantity of resin on the honeycomb was increased by dipping the honeycomb in resin, removing excess resin by allowing it to stand on an absorbent paper, drying the honeycomb at 60° C. for 30 minutes and then repeating the procedure. This procedure resulted in a sample having 10.2 weight percent activated carbon compared to 6.6 weight percent activated carbon on the sample of Example 1. The two minute adsorption efficiency was 99.94 weight percent and the total weight of hydrocarbon adsorbed was 82.67 mg, indicating that the increased carbon yield resulted in significantly higher total adsorption capability.

Example 3

A sample was prepared according to the procedure described in Example 2, except that the sample was core drilled from a 15 cells/cm² honeycomb having an internal wall thickness of about 430 microns. The sample had a two minute adsorption efficiency of 91.68 weight percent and a total adsorption of 153 mg. Comparison with the samples of Examples 1 and 2 shows that the two minute adsorption efficiency thus is lower for the 15 cell/cm² sample. This result is expected due to the lower geometric surface area available to the flowing gas. The total adsorption capability is higher due to higher amounts of activated carbon in the thick, porous walls of the 15 cells/cm² sample, which retain a large amount of the precursor liquid.

Example 4

A sample was prepared according to the procedure described in Example 3, except that the carbonization atmosphere was a mixture of nitrogen and hydrogen (94:6) ("forming gas"). The sample had a two minute adsorption efficiency of 90.77 weight percent and total adsorption of 145.2 mg. Although the results are slightly lower than in the case of Example 3, where nitrogen alone was used as the carbonization atmosphere, they are comparable.

Example 5

A sample was prepared according to the procedure described in Example 2, except that the carbonization heating rate was 300° C. per hour instead of 100° C. per hour and steam activation was with 25 mole percent steam in nitrogen. The two minute adsorption efficiency of the sample was 99.98 weight percent and total adsorption was 84 mg indicating that rate of heating during carbonization does not significantly affect the total adsorption or two minute adsorption efficiency.

Example 6

A sample was prepared according to the procedure described in Example 5 except that activation was performed with 88 mole percent steam in nitrogen. The resulting honeycomb had a two minute adsorption efficiency of 98.11 weight percent and total adsorption of 43 mg. Therefore, increasing the ratio of steam from 25 to 88 mole percent in the activation step results in decreasing the adsorption capability of the composite by about 50 percent.

Example 7

Carbon precursor liquids were prepared using thermoplastic polymers. Polyvinyl alcohol was added to water at a concentration of one weight percent. Separate solutions of polyvinylidene chloride and polyvinyl chloride, respectively were added to tetrahydrofuran at a concentration of one weight percent. Samples were then prepared according to the procedure described in Example 1 using each respective thermoplastic resin as the carbon precursor. Analysis of the carbon content of the resulting samples indicated that the samples contained only 1 to 2 weight percent carbon, based on the weight of the uncoated cordierite substrate. Samples prepared using a thermoset resin as a carbon precursor (i.e., the sample of Example 1) contain 30 to 40 weight percent carbon. These results indicate that thermoset resins are preferred to thermoplastic resins as a carbon precursor due to the increased carbon yield obtained when thermoset resin is used as a carbon precursor.

Example 8

20 weight percent activated carbon powder (BPLF3, sold by Calgon Carbon, Pittsburgh, Pa., was dispersed in a 50:50 weight ratio mixture of Plyophen TM 43-290 phenolic resin and distilled water. A 2.54 cm diameter, 2.54 cm high honeycomb having about 60 cells/cm² and a wall thickness of about 150 microns was dipped in the resulting mixture for ten minutes. The coated sample was heated at 150° C. for 30 minutes to cure the phenolic resin. Adsorption analysis of the sample revealed a two minute adsorption efficiency of less than 10 weight percent and a total hydrocarbon adsorption of 2.13 mg. These results indicate that coating a substrate directly with activated carbon in a curable liquid does not provide a composite exhibiting useful adsorptive capability. This is probably due to the cured precursor material clogging pores in the activated carbon.

Example 9

The sample of Example 8 was carbonized in forming gas at 900° C. and its adsorption efficiency measured. The sample had a two minute adsorption efficiency of 91.3 weight percent and a total adsorption of 71.9 mg. These results indicate that carbonizing the cured phenolic resin will unclog the pores of the activated carbon and provide a composite with useful adsorption properties.

Example 10

The sample of Example 9 was heated at 800° C. and exposed to a mixture 34 mole percent steam in nitrogen for one hour to activate the carbon formed from the cured phenolic resin. The sample exhibited a two minute adsorption efficiency of 95 weight percent and total adsorption of 79.4 mg. Activation thus results in an improvement in total adsorption as well as in two minute adsorption efficiency.

Example 11

Six samples core drilled from a cordierite honeycomb (60 cells/cm², 150 micron wall thickness) were coated with activated carbon according to the procedures described in Example 2. The samples were then subjected to a heat treatment at 250° C. for four hours in air. The crush strengths of these samples were measured by mounting a 2.54 cm diameter, 2.54 cm thick sample between two steel platens and applying an increasing mechanical load, utilizing a crosshead speed of 1.02 mm/minute until the sample failed. The recorded result was the load at the time of failure. The crush strengths of the inventive composites were then compared to the crush strengths of uncoated, untreated cordierite honeycomb samples. The average crush strength of coated and treated samples was 268 kilograms/cm² compared to 191 kilograms/cm² for uncoated, untreated cordierite samples. The increased strength of the coated samples is attributable to resin infiltration into the pores and cracks of the substrate. Upon curing, the resin imparts increased strength to the substrate. As a result, composites with very high strengths can be produced according to the inventive method.

A second set of substrates (the "extruded samples") were formed by extruding activated carbon as described below. A batch containing six weight percent hydroxy propyl methylcellulose, two weight percent polyvinyl alcohol and −200 mesh activated carbon (Calgon Carbon BPLF3) was dry mixed in a turbula mixer for three minutes. The mixed, dry ingredients were charged to a Muller Mixer ™ and a sufficient amount of water was added to form a homogeneous, plasticized batch. Mixing time was about 30 minutes. The plasticized batch was extruded through a 25 ton extrusion press to form honeycombs of 2.54 cm diameter. The extruded samples exhibited the same geometry as the inventive samples (i.e., 60 cell/cm$^2$, 150 micron wall thickness). The samples were dried at 100° C. to remove water. The crush strength of these honeycombs was measured as described above. The average crush strength of the as formed honeycombs was 35.2 kg/cm$^2$. The strength of the inventive samples and the extruded samples were again measured after exposure to 250° C. in air for four hours. The extruded samples had an average crush strength of 0–1 kg/cm$^2$. The inventive samples had an average crush strength of 268 kg/cm$^2$. These results indicate that composites produced according to the inventive method exhibit much higher strength and temperature capability than substrates produced by extruding activated carbon.

Example 12

The sample of Example 2 was subjected to 350° C., 4 hour, air treatment and adsorption capability was analyzed. The treated sample exhibited a two minute adsorption efficiency of 99.93 weight percent and total butane adsorption was 78.3 mg. Comparison with the sample of Example 2 (untreated) reveals virtually no difference between the adsorption capability of the treated and untreated composites. These results illustrate the ability of the composites of the present invention to operate effectively at high temperatures.

Example 13

A cordierite honeycomb substrate having 60 cells/cm$^2$, a wall thickness of 150 microns, and an overall porosity of 50 percent was coated with phenolic resin, cured, and carbonized according to the procedures described in Example 1. The carbon on the substrate was activated in a mixture of 23 mole percent steam in nitrogen at 800° C. The resulting composite contained a total of 1.15 g of carbon. A second substrate (the "extruded sample") was prepared by dry-mixing a batch containing six weight percent hydroxypropylmethylcellulose, two weight percent polyvinyl alcohol as a dry powder, and −200 mesh activated carbon in a turbula mixer for 30 minutes. The mixed, dry ingredients were charged to a Muller ™ Mixer and sufficient amount of water was added to form a homogenous, plasticized batch. Mixing time was about 30 minutes. The plasticized batch was then extruded through a 25 ton extrusion press to form honeycombs having a diameter of 2.54 cm and a length of 2.54 cm. The extruded sample had a cell concentration of 60 cells/cm$^2$ and a wall thickness of about 150 microns. The extruded sample was 92 weight percent carbon, containing a total of 2.25 g of carbon. The samples were dried at 100° C. to remove water. The adsorption capability of the two samples was measured as described in Example 1. The total adsorption of the inventive sample was 154.5 mg, while the total adsorption of the extruded sample by extruding activated carbon was 155.5 mg. These comparable adsorption capabilities are unexpected because the inventive sample contains less than half the carbon of the extruded sample.

Example 14

A honeycomb substrate (60 cell/cm$^2$, 150 micron wall thickness), having a 2.54 cm diameter and 2.54 cm length, was dipped in a slurry of 250 g water, 10 g of phenolic resin, and 90 g activated carbon [Calgon Carbon BPLF3, −200 mesh) and excess solution was blown off the channels. The sample was baked at 150° C. for 5 minutes. The slurry-dipping process was then repeated to increase the thickness of the slurry coating. After the second dipping, the sample was baked at 150° C. for 4 hours to cure the resin. Butane adsorption capability of the cured sample was measured according to the procedure described in Example 1, above. Total adsorption capacity (Adsorp. Capacity) of the slurry-dipped sample, as well as the extruded and inventive samples of Example 13, was determined by dividing the total adsorption of butane of each sample by the amount of activated carbon present on/in the sample and expressed as mg of butane adsorbed/g of activated carbon present. The results are shown below in Table I, below.

TABLE I

| | | Amount of Carbon (g) | Butane Capacity (mg) | Adsorp. Capacity (mg/g) |
|---|---|---|---|---|
| Sample 1 | Inventive Sample | 1.15 | 154.2 | 134.3 |
| Sample 2 | Extruded Sample | 2.25 | 155.5 | 69.1 |
| Sample 3 | Slurry-dipped Sample | 1.7 | 90 | 52.9 |

As illustrated by Table I, the adsorption capacity of the inventive sample is two and a half times that of the slurry-dipped sample and two times that of extruded (all carbon) sample. Therefore, the adsorption capacity of the inventive sample is significantly and unexpectedly improved over that of the slurry-dipped and extruded samples. In addition, the inventive sample does not exhibit problems such as binder deterioration at low temperatures and poor bonding of the carbon to the inorganic substrate (resulting in poor durability) as seen in both the slurry-dipped and extruded, all carbon samples.

Example 15

A cordierite honeycomb substrate having 15 cells/cm$^2$, a wall thickness of 430 microns, and an overall porosity of 45 percent was coated with phenolic resin, cured, and carbonized according to the procedures described in Example 1. The carbon on the substrate was activated in a mixture of 23 mole percent steam in nitrogen at 800° C. The resulting composite contained a total of 1.12 g of carbon. A second substrate (the "extruded sample") was prepared by extruding a combination of activated carbon and a polymer binder in a comparable honeycomb configuration according to the procedure for preparing the extruded sample described in Example 13. The extruded sample contained a total of 3.06 g of carbon. The adsorption capability of the two samples was measured as described in Example 1. The total adsorption of the inventive sample was 169 mg, while the total adsorption of the extruded sample was 180 mg. Like Example 13 above, these comparable adsorption capabilities are unexpected because the inventive sample contains approximately only one third the carbon of the extruded sample.

Example 16

Two samples were prepared according to the procedure described in Example 1, except that one of the samples had about 60 cells/cm$^2$ and a wall thickness of about 150 microns (geometric surface area of 27.7 cm$^2$/cm$^3$). The second sample had about 15 cells/cm$^2$ and a wall thickness of about 430 microns (geometric surface area of 15.1 cm$^2$/cm$^3$). The adsorption capability of the two samples is illustrated in Table II below. The total mg of butane adsorbed and the efficiency at 2 minutes in the bench scale test are reported in Table II, below.

TABLE II

| Honeycomb geometry cells/wall thickness | Total Adsorption (mg) | 2 Minute adsorption efficiency (%) | Geo. Surface Area (cm$^2$/cm$^3$) |
|---|---|---|---|
| 60/150 | 154.48 | 99.96 | 27.7 |
| 15/430 | 168.45 | 91.48 | 15.1 |

As shown by Table II, the honeycomb having a higher geometric surface area (60 cells/cm$^2$, 150 micron wall thickness) exhibited a higher adsorption efficiency. This is attributable to the fact that adsorption is a surface phenomena and is thereby influenced by the geometric surface area of the honeycomb itself, especially when measuring adsorption capability over short time intervals.

Example 17

Three porous, sintered, metallic honeycombs containing differing ratios of iron, chromium, and aluminum were prepared according to procedures described in U.S. Pat. Nos. 4,992,233 and 4,758,272. The metallic honeycombs were fired at a top temperature of 1100° C. and, consequently, were highly porous. The metallic honeycombs were coated according to the procedure described above in Example 1. The properties of the coated, metallic honeycombs are illustrated in the Table III, below.

TABLE III

| No. | Composition | Porosity Percent | Carbon wt. percent |
|---|---|---|---|
| 4 | 80% Fe, 10% Cr, 10% Al | 24 | 5.0 |
| 5 | 78% Fe, 12% Cr, 10% Al | 32 | 5.5 |
| 6 | 70% Fe, 20% Cr, 10% Al | 31 | 5.2 |

In each sample, a useful amount of carbon was coated onto the metal honeycombs. The coatings were well adhered, thus illustrating the usefulness of the inventive method with metallic substrates.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A composite comprising:
    an inorganic monolithic substrate having surfaces with pores which extend into said substrate; and
    a coating extending over said substrate's surfaces as a substantially uninterrupted, adherent layer of activated carbon, wherein said coating penetrates into said pores of said inorganic substrate.

2. A composite according to claim 1, wherein said substrate is formed from a material selected from the group consisting of ceramic and metallic materials.

3. A composite according to claim 1, wherein said substrate is formed from a material selected from the group consisting of alumino-silicates, silicates, titanates, zirconates, zirconia, zirconia-spinel, magnesium alumino-silicates, alumina, spinel, mullite, and cordierite.

4. A composite according to claim 1, wherein said substrate is formed from an alloy including Fe, Ni, or Co.

5. A composite according to claim 4, wherein said substrate is formed from an alloy consisting essentially of an iron group metal and aluminum.

6. A composite according to claim 4, wherein said substrate is formed from an alloy consisting essentially of Fe, Al, and Cr.

7. A composite according to claim 1, wherein said pores of said substrate create an interconnecting porosity within said substrate and said carbon coating is physically interlocked within said interconnecting porosity.

8. A composite according to claim 7, wherein said substrate comprises cordierite.

9. A composite according to claim 1, wherein said substrate is a ceramic honeycomb having a matrix of thin walls forming a multiplicity of open-ended cells extending between the ends of said honeycomb.

10. A composite according to claim 9, wherein said honeycomb has at least about 7.75 cells per square centimeter and said thin walls have a thickness in the range of about 0.05 to 1.27 millimeters.

11. A composite according to claim 9, wherein said carbon coating comprises no more than about 50 percent of the total weight of said honeycomb.

12. A composite according to claim 11, wherein said carbon coating comprises no more than about 30 percent of the total weight of said honeycomb.

13. A composite according to claim 9, wherein said honeycomb has an overall porosity of at least about 25 percent.

14. A composite according to claim 13, wherein said honeycomb has an overall porosity of at least about 45 percent.

15. A composite according to claim 1, wherein said coating is highly resistant to chipping or flaking off of said inorganic monolithic substrate.

16. A composite according to claim 1, wherein said coating is distributed substantially throughout and anchored in the pores of said inorganic monolithic substrate.

* * * * *